May 2, 1950     T. H. McKINLEY     2,506,032
LAWN SPRINKLER
Filed Nov. 9, 1945
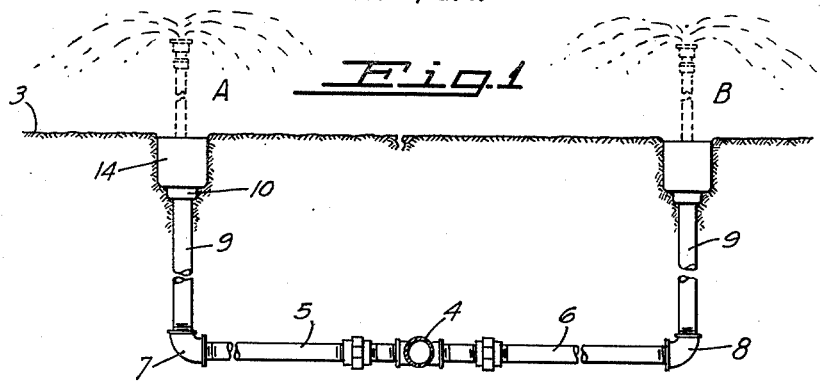
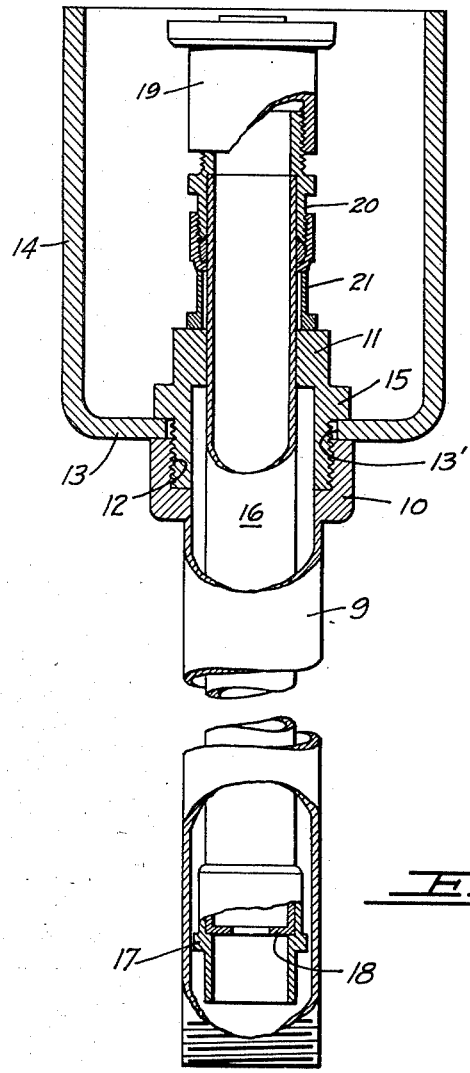
INVENTOR
Thomas H. McKinley
BY Edward C. Healy
ATTORNEY Patented May 2, 1950

2,506,032

UNITED STATES PATENT OFFICE 2,506,032

LAWN SPRINKLER

Thomas H. McKinley, Redding, Calif.

Application November 9, 1945, Serial No. 627,560

1 Claim. (Cl. 299—61)

This invention relates to improvements in sprinkling systems and has particular reference to a sprinkler for automatically sprinkling lawns and emitting water where irrigation is required.

The principal object of the invention is the provision of concealed sprinkler elements that are operated by the pressure of water directed against said elements to cause the sprinklers to be elevated above the ground surface from their concealed position so that a considerable area of ground can be quickly and efficiently watered.

A further object of the invention is the provision of an appliance of the character described that is simple in construction, economical to manufacture, positive in operation, strong, durable and highly efficient in use.

Other objects and advantages will be apparent during the course of the following description.

In the accompanying drawing forming a part of this specification and in which like numerals are employed to designate like parts throughout the same, Fig. 1 is a side elevation of a pair of sprinklers disclosed in operative position relative to the ground surface, with the source of water supply, that is illustrated partly in section and partly in elevation, being shown as positioned beneath the ground surface, and Fig. 2 is an enlarged detail view of one of the sprinklers, the same being illustrated partly in section and partly in elevation.

In the accompanying drawing wherein for the purpose of illustration is shown a preferred embodiment of my invention, the numeral 3 designates the ground level or surface in which a pair of the sprinklers are positioned, while the numeral 4 indicates a T that is connected to the main water supply line.

A pair of pipes 5 and 6 are disclosed as connected to the T end are likewise secured at their outer ends to elbows 7 and 8 that receive therein a pair of sprinkler elements designated as a whole by the reference characters A and B. Since both elements are similar in construction but one will be described.

Each sprinkler embodies in its construction an outer cylindrical casing 9 that is exteriorly threaded adjacent its lower end to threadedly receive the internal threads of either of the elbows 7 or 8. It will be noted, as disclosed to advantage in Fig. 2 that the upper end of the casing is equipped with an internally threaded collar 10 that receives therein a lock nut 11 in turn externally threaded as at 12 to threadedly engage the collar 10. The base 13 of a cup 14 has a central recess 13' therein, and said base is interposed between the shoulder 15 and the upper face of the collar. The cup is thus retained in an upright position relative to the casing and having a large configuration is spaced upon the upper portion of the sprinkler.

The numeral 16 indicates a pipe that is of a smaller diameter than the casing 9, and is vertically movable therethrough when actuated by water pressure, as will be hereinafter explained. It will be noted that a hexagonal nut 17 is fitted about the lower end of the pipe to prevent displacement of a pipe from the casing when the said pipe is raised from its normal telescoping position of Fig. 2 to its raised or elevated position of Fig. 1. It will be further observed that the end of the pipe is equipped with an apertured base 18 that permits the passage of water therethrough, the base and the nut also serving as a resisting means against which the water impinges to effect a raising of the pipe in the casing, when the water under pressure enters the casing.

A sprinkler head is indicated by the numeral 19 and said head is detachably secured to the upper end of a standard coupling 20 that is secured on the pipe 16. A sleeve 21 loosely surrounding the said pipe is interposed between the coupling 20 and the top surface of the lock nut 11. This sleeve functions to absorb the shock of the descending spray pipe after the water has been turned off and the pipe automatically assumes the position illustrated in Fig. 2 of the drawing.

While I have disclosed a pair of sprinklers it is obvious that any number can be employed and the same are suitably positioned at spaced areas in a lawn or other surfaces to be watered. A suitable valve controlled means (not disclosed) is remotely or otherwise located relative to my system and being connected to the water supply pipe, serves as a means for turning on and off the water supply. It will be obvious that when the valve is turned on the water under pressure that enters the pipes 5 and 6 will readily pass through the bottom of the casings 9 and will thus automatically force the pipes 16 from the position of Fig. 2 to the elevated position of Fig. 1. The water then passing through the apertured bases 18 will be conveyed through the sprinkler pipes 16 to the sprinkler heads 19 and thence to the ground surface 3. Then when the water has been turned off, the said sprinkler pipes will assume the position of Fig. 2 and the heads and upper structures of the pipes 16 will be concealed in the cups 14.

From the foregoing description considered in connection with the foregoing drawing it will be obvious that I have devised a most unique and efficient sprinkler device that is automatic in its operation, and wherein the parts thereof can be readily disassembled for renewal, when necessary.

It is to be understood that the form of my invention herewith shown and described is to be taken as a preferred example of the same and that various changes relative to the material, size, shape and arrangement of parts may be resorted to without departing from the spirit of the invention or the scope of the subjoined claim.

Having thus described my invention, I claim:

In combination with an underground water supply system, means for conveying water under pressure from the supply system to a water sprinkling position above ground level, said means comprising a casing in communication with the water supply system, a pipe positioned in said casing, a coupling secured to said pipe, a lock nut associated with said casing, a sleeve loosely surrounding said pipe and being interposed between said coupling and the top surface of said lock nut, and an internal and external water resisting means provided on the lower end of said pipe said last mentioned means comprising an apertured base formed in said pipe and an external nut formed on said pipe adjacent the lower end thereof.

THOMAS H. McKINLEY.

REFERENCES CITED

The following references are of record in the file of this patent:

UNITED STATES PATENTS

| Number | Name | Date |
|---|---|---|
| 1,058,549 | Cathcart | Apr. 8, 1913 |
| 1,192,743 | Brooks | July 25, 1916 |
| 1,919,243 | Munz | July 25, 1933 |
| 2,360,203 | Cox | Oct. 10, 1944 |